US005896606A

United States Patent [19]

Huang

[11] Patent Number: 5,896,606

[45] Date of Patent: Apr. 27, 1999

[54] TOOL HAVING AN EXTENDIBLE MAGNET

[76] Inventor: Yung Hsu Huang, No. 10, Lane 38, Li Der Street, Taiping City, Taichung Hsien, Taiwan

[21] Appl. No.: 08/895,945

[22] Filed: Jul. 17, 1997

[51] Int. Cl.[6] ...................................................... B25B 15/00

[52] U.S. Cl. ................................. 7/165; 7/901; 81/177.4; 81/490

[58] Field of Search .............................. 81/439, 489, 490, 81/177.4, 451; 7/138, 165, 901; 294/65.5, 19.1, 22

[56] References Cited

U.S. PATENT DOCUMENTS

| | | | |
|---|---|---|---|
| 2,428,864 | 10/1947 | Boyd | 294/65.5 |
| 2,471,764 | 5/1949 | Miller et al. | 294/65.5 |
| 2,834,241 | 5/1958 | Chowning | 81/125 |
| 3,228,720 | 1/1966 | Jordan | 7/901 X |
| 4,905,335 | 3/1990 | Tervola | 7/901 X |
| 5,487,576 | 1/1996 | DuVivier | 294/19.1 |
| 5,704,260 | 1/1998 | Huang | 81/490 X |

*Primary Examiner*—James G. Smith

[57] ABSTRACT

A tool includes a driving stem secured to a handle for engaging with a tool bit, and a telescopic member engaged in and secured to the handle and having one end extendible outward of the handle. A magnet is secured to the telescopic member for allowing the magnet to be extended away from the handle to attract a fastener. The handle includes a base and a cap pivotally coupled together for receiving tool bits in the base. The magnet may be extended to a long distance from the handle for allowing the magnet to attract the fastener engaged in a deep portion of an object.

7 Claims, 4 Drawing Sheets

TOOL HAVING AN EXTENDIBLE MAGNET

BACKGROUND OF THE INVENTION

1. Field of the Invention

The present invention relates to a tool, and more particularly to a tool having an extendible magnet.

2. Description of the Prior Art

Typical tools, such as the screw drivers comprise a driving stem extended from a handle. The driving stem may be magnetized for attracting the fasteners dropped in a deep portion that may not be easily fetched by the user. However, the driving stem may not be extended to a longer length such that the engagement of the driving stem into the deep portion is limited by the length of the driving stem.

The present invention has arisen to mitigate and/or obviate the afore-described disadvantages of the conventional tools.

SUMMARY OF THE INVENTION

The primary objective of the present invention is to provide a tool having an extendible magnet for allowing the magnet to attract fasteners in deep portion.

In accordance with one aspect of the invention, there is provided a tool comprising a handle including a channel and including a first end and including a second end, a driving stem secured to the first end of the handle for engaging with a tool bit, a telescopic member engaged in the channel of the handle and including a first end secured to the handle and including a second end extendible outward of the handle, and a magnet secured to the second end of the telescopic member for allowing the magnet to be extended away from the handle and for allowing the magnet to attract a fastener.

The handle includes an opening formed in the second end for receiving the magnet. The handle includes at least one depression formed in the second end for allowing a user to engage with and to fetch the magnet. The driving stem includes an inner end engaged in the handle and having a puncture for engaging with the first end of the telescopic member.

The handle includes a base and a cap pivotally coupled to the base at a hinge device, the base includes a side portion opposite to the hinge device and having a flange and at least one orifice provided therein, the cap includes a side portion opposite to the hinge device and having a slot and at least one projection for engaging with the flange and the at least one orifice of the base and for allowing the cap to be secured to the base. The base includes a plurality of holes for receiving tool bits and includes a recess and a cavity, the cap includes an ear for engaging with the recess of the base and having a bulge for engaging with the cavity of the base and for securing the cap to the base.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
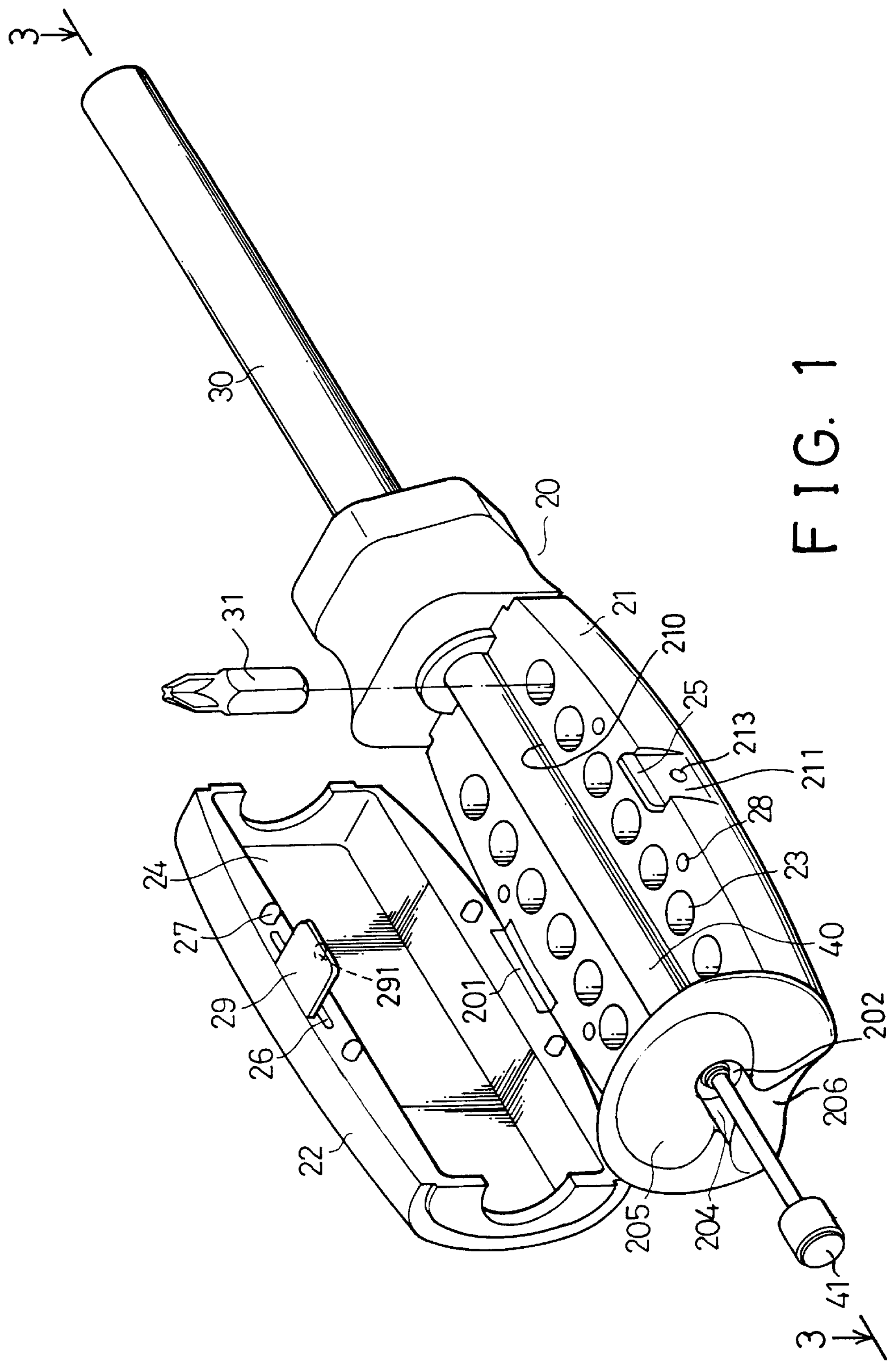
FIG. 1 is a perspective view of a tool in accordance with the present invention, in which a cap is opened for showing the interior of the tool handle.
Figure 2:
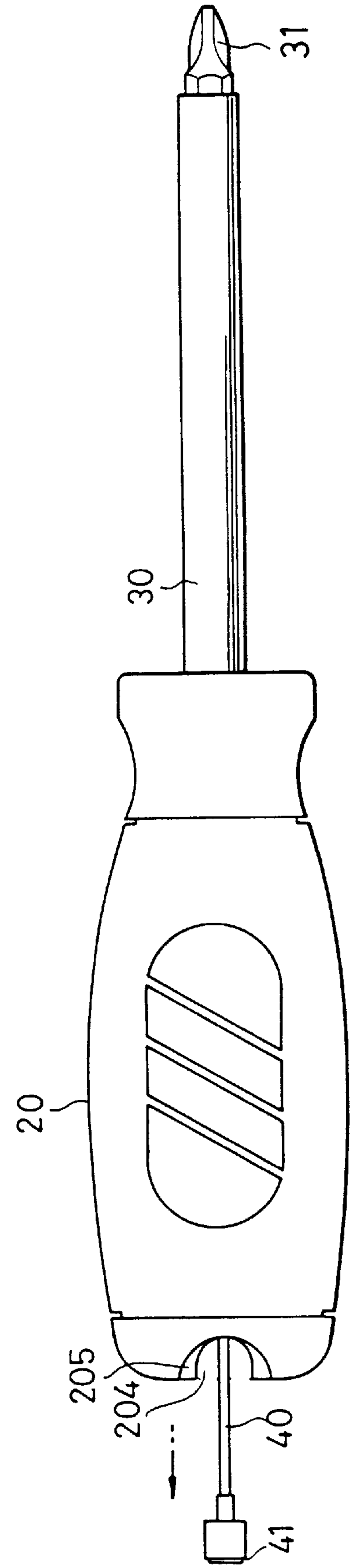
FIG. 2 is a plane view of the tool.
Figure 3:
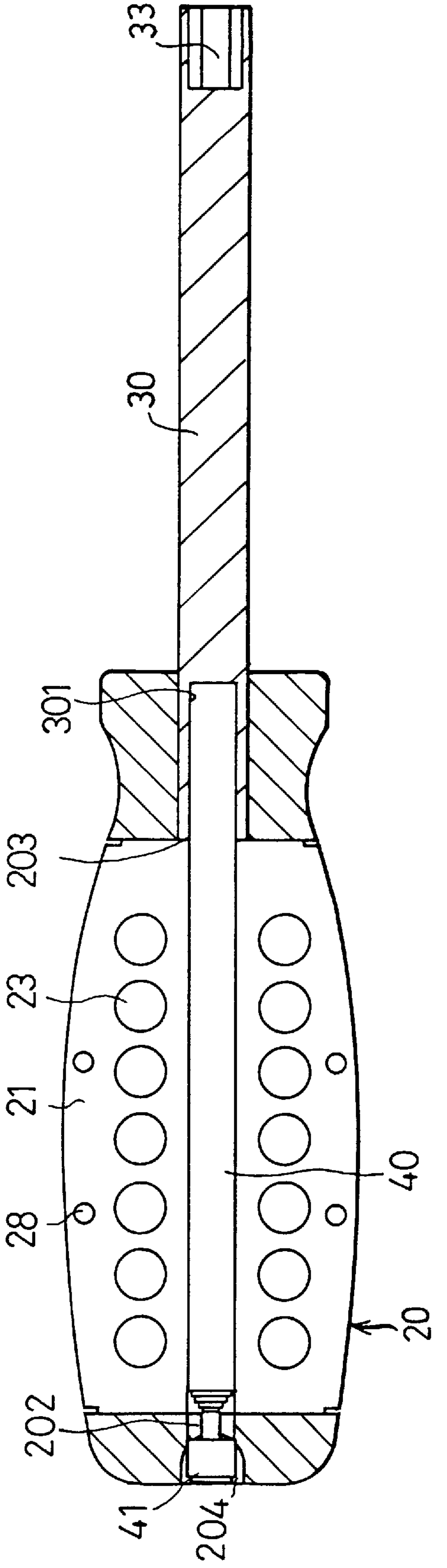
FIG. 3 is a cross sectional view taken along lines 3—3 of FIG. 1.

Referring to the drawings, and initially to FIGS. 1–3, a tool having an extendible magnet in accordance with the present invention comprises a handle 20 including a base 21 having a number of holes 23 for engaging with tool bits 31 and having a channel 210 for engaging with a telescopic member 40. A cap 22 is pivotally coupled to the base 21 at a live hinge 201 and includes a slot 26 and two projections 27 and an ear 29 provided on the side portion opposite to the live hinge 201, for engaging with the flange 25 and the orifices 28 and the recess 211 of the base 21 respectively and for allowing the cap 22 to be secured to the base 21. The ear 29 includes a bulge 291 for engaging with a cavity 213 of the base 21 and for further securing the cap 22 to the base 21. The cap 22 includes a chamber 24 for receiving and for engaging with the tool bits 31.

A driving stem 30 is secured to the front portion of the handle 20 and includes an engaging hole 33 for engaging with the tool bit 31. The driving stem 30 includes a puncture 301 formed in the inner end which is engaged in the handle 20 (FIG. 3). The telescopic member 40 is engaged into the channel 210 of the base 21 from a rear opening 202 and includes one end secured in the puncture 301 of the driving stem 30 and includes a magnet 41 secured to the other end, for allowing the magnet 41 to be extended to a long distance away from the handle 20 by the telescopic member 40. The rear portion of the handle 20 includes an opening 204 for receiving the magnet 41 and includes one or two depressions 205, 206 for allowing the user to fetch the magnet 41 and to pull the magnet 41 outward of the handle 20 (FIG. 2).

Figure 4:
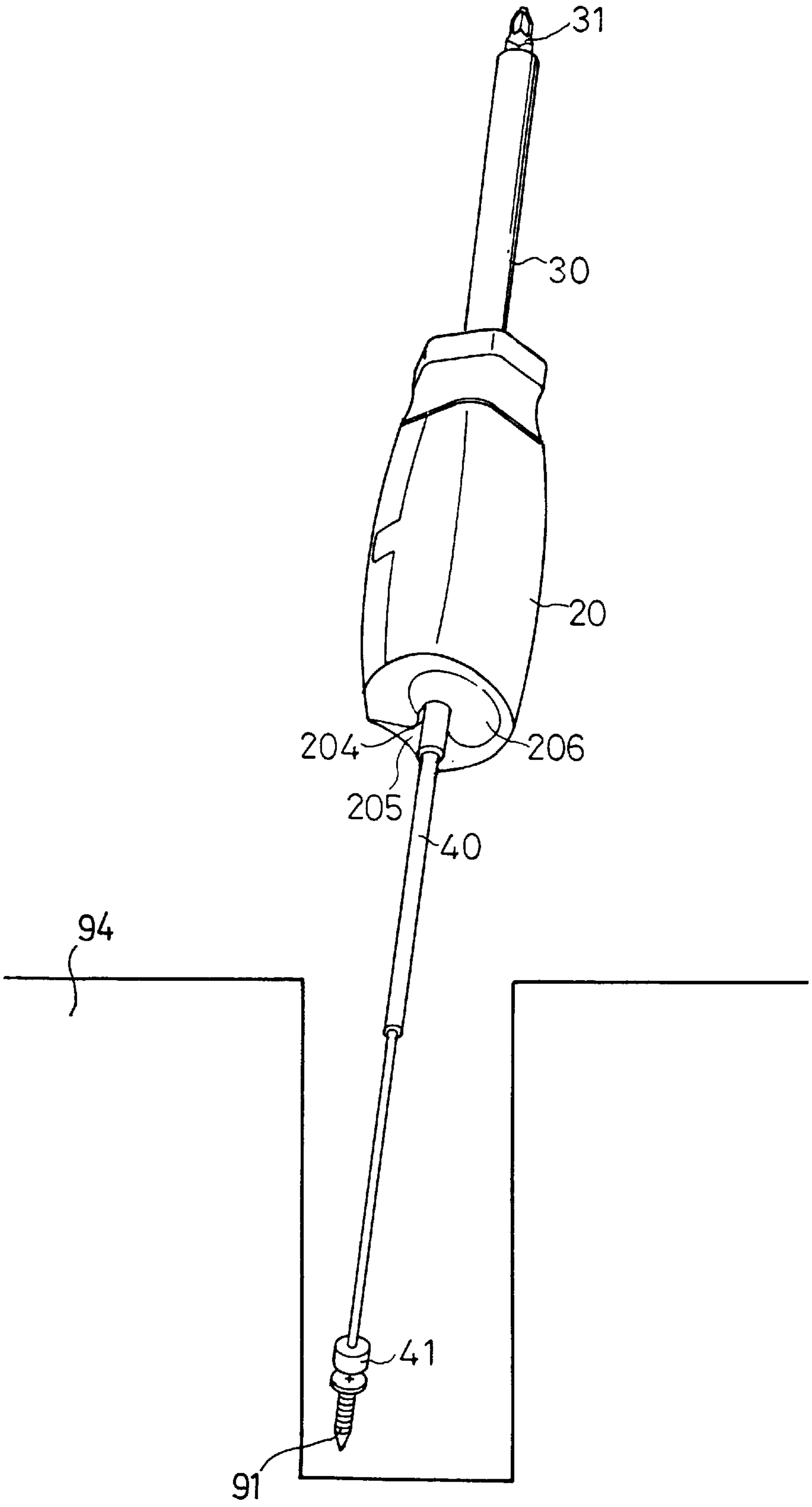
FIG. 4 is a perspective view illustrating the operation of the tool.

In operation, as shown in FIG. 4, the magnet 41 may be extended to a long distance from the handle 20 for allowing the magnet 41 to attract the fastener 91 engaged in a deep portion of an object 94. The engagement of the magnet 41 in the deep portion of the object 94 will not be limited by the length of the driving stem 30. It is to be noted that the magnet 41 is provided in the handle 20 opposite to the driving stem 30 and will not affect the driving strength of the driving stem 30.

Accordingly, the tool handle having an extendible magnet in accordance with the present invention includes a magnet that may be extended to a long distance from the handle for allowing the magnet to attract the fastener engaged in a deep portion of an object.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool comprising:

a handle including a channel and including a first end and including a second end, a driving stem secured to said first end of said handle for engaging with a tool bit, a telescopic member engaged in said channel of said handle and including a first end secured to said handle and including a second end extendible outward of said handle, and a magnet secured to said second end of said telescopic member for allowing said magnet to be extended away from said handle and for allowing said magnet to attract a fastener.

2. A tool according to claim 1, wherein said handle includes an opening formed in said second end for receiving said magnet.

3. A tool according to claim 1, wherein said handle includes at least one depression formed in said second end for allowing a user to engage with and to fetch said magnet.

4. A tool according to claim 1, wherein said driving stem includes an inner end engaged in said handle and having a puncture for engaging with said first end of said telescopic member.

5. A tool according to claim 1, wherein said handle includes a base and a cap pivotally coupled to said base at a hinge device, said base includes a side portion opposite to said hinge device and having a flange and at least one orifice provided therein, said cap includes a side portion opposite to said hinge device and having a slot and at least one projection for engaging with said flange and said at least one orifice of said base and for allowing said cap to be secured to said base.

6. A tool according to claim 5, wherein said base includes a plurality of holes for receiving tool bits.

7. A tool according to claim 5, wherein said base includes a recess and a cavity, said cap includes an ear for engaging with said recess of said base and having a bulge for engaging with said cavity of said base and for securing said cap to said base.

* * * * *